UNITED STATES PATENT OFFICE.

WALTER S. ROCKEY AND HILLIARY ELDRIDGE, OF NEW YORK, N. Y.

FLUX FOR PROTECTING A BATH OF COPPER OR BRASS.

971,564.  Specification of Letters Patent. Patented Oct. 4, 1910.

No Drawing.  Application filed December 20, 1909. Serial No. 534,005.

*To all whom it may concern:*

Be it known that we, WALTER S. ROCKEY and HILLIARY ELDRIDGE, citizens of the United States, residing at New York city, in the county of New York and State of New York, have invented certain new and useful Improvements in Flux for Protecting a Bath of Copper or Brass, of which the following is a full, clear, and exact specification.

Our invention relates to a process for making a protecting flux, for use in plating single articles of iron, cast iron, malleable iron, or steel with copper or brass.

Provide an iron pot silver plated on the inside for the purpose of boiling the water out of boracic acid; the reason for silver plating the iron pot on the inside is to prevent any oxidation of the iron of the pot by the water that is in the boracic acid. The oxygen of the water, at a low heat, combining with the iron of the pot, forms iron oxid which is detrimental to good copper or brass plating. Silver at a low heat does not decompose water, and for this reason we silver plate the iron pot on the inside. Boil boracic acid in this pot at a low heat until all steam ceases to pass off; then transfer the boracic acid from the iron pot into an aluminum oxid, magnesite, or magnesium oxid crucible, or a crucible that is used for melting glass in glass works, are good for melting boracic acid. After the boracic acid is transferred to the crucible as designated the crucible is then heated to a white heat until the molten boracic acid becomes placid and shows no ebullition of bubbles, then the temperature is reduced to a low red heat, then a sufficient quantity of powdered silica is added to cause the flux to become dense and therefore more non-hydroscopic after completion as flux containing moisture or water is detrimental to good plating, then a sufficient quantity of metallic zinc is added to the mass, to decompose the constitutional water that is still remaining in the boracic acid and the moisture that may be in the silica. After the zinc is added, cover the crucible with a loose cover and keep the cover on until the reaction is over; the cessation of the reaction is denoted by the green flames ceasing to pass out from under the edges of the cover. When they cease remove and stir the mass with a clay rod until all bubbles are eliminated. The reaction being over there now remains in the crucible a mixture of boron-trioxid silica and zinc oxid. This mass upon being heated to a higher temperature becomes boro-zinc silicate. The hydrogen of the water being released and gaseous, passed off from under the cover during the reaction and being ignited by the furnace fire, presented the appearance of green flames on account of the hydrogen being impregnated with boron trioxid or its impurities which changed the hydrogen blue color to a green. The flux now being ready for use can be preserved for future use by pouring it out of the crucible while still molten into clean iron receptacle, silver plated on the inside, which is provided with an air tight cover. But, however, should it be desired to use the flux at once for plating, or plating and welding, then put into the crucible while it is still in the furnace and the flux is still molten the copper or brass with which it is desired to plate. Care must be taken when the copper or brass is put into the crucible to see that it is well covered by the flux, for if any of the copper or brass should protrude above the surface of the flux it will oxidize. The temperature should then be regulated to just above the fusing point of the copper or brass which is being melted and kept at that temperature until the copper or brass has become thoroughly fused and liquid. Then immerse a chemically cleaned piece of sheet iron or other forms of iron or steel into the molten copper or brass through the covering of flux and then withdraw it. After withdrawal, the iron or steel article will be found to be covered with two separate and distinct strata or coverings, one a plating or coating of brass or copper as the case may be on the iron or steel which adheres to and has become an integral part of the iron or steel and the other a coating or covering of the flux over the copper or brass which protected the copper or brass from becoming oxidized when withdrawn from the bath. This covering of flux is detachable and is removed from the copper or brass plated iron or steel after cooling and is remelted and is again used for plating. Instead of using metallic zinc to decompose the constitutional water we can use carbon, cadmium, antimony, bismuth, or any of the elements that decompose water at a red or white heat.

Having thus described our invention what we claim as new and desire to secure by Letters Patent is:

1. The process of making a protecting flux for copper or brass consisting in first placing boracic acid in a silver lined pot and reducing same to a fluid condition by heat, then transferring said boracic acid to a suitable crucible and heating said acid until it becomes placid, then adding silica to cause the mixture to become more non-hydroscopic after completion, then adding metallic zinc sufficient to decompose the remaining constitutional water of the boracic acid and the moisture that may be in the silica.

2. The process of making a flux which consists in first boiling boracic acid in an iron pot, silver plated on the inside, at a low temperature until it ceases to emit steam, then transferring same to a suitable crucible and heating at a white heat until it becomes placid, then reducing the temperature to a bright red heat, then adding a sufficient quantity of silica to cause the mixture to become more non-hydroscopic after completion, then adding a sufficient quantity of metallic zinc to decompose the remaining water of the boracic acid and the moisture that may be in the silica.

3. The process of making a flux for plating with copper or brass which consists in boiling boracic acid in an iron pot, silver plated on the inside, at a low temperature until all steam ceases to come off, then transferring same into a suitable crucible and heating at a white heat until it becomes placid, then reducing the temperature to a bright red heat, then adding silica to cause the mixture to become more non-hydroscopic after completion, then adding a sufficient quantity of zinc in a divided state to decompose the remaining water of the boracic acid and the moisture that may be in the silica and then stirring the mass with a suitable rod until all reaction ceases, then raising the heat to a high temperature to fuse the boron trioxid, silica and zinc oxid, which compose the mass, into a boro-zinc silicate.

4. The process of making a protecting flux for copper or brass consisting in reducing boracic acid to a fluid condition by heat and then adding silica to cause the mixture to become more non-hydroscopic after completion; then adding a suitable material such as metallic zinc, carbon, cadmium, antimony, bismuth, or any of the elements that decompose water at a red or white heat, to decompose the remaining water.

In testimony whereof, we affix our signatures, in presence of two witnesses.

WALTER S. ROCKEY.
HILLIARY ELDRIDGE.

Witnesses:
G. F. QUACKENBUSH,
JOSEPH MATTES.